United States Patent

Meijer et al.

(10) Patent No.: US 9,678,789 B2
(45) Date of Patent: *Jun. 13, 2017

(54) METHODS AND SYSTEMS FOR PRIORITIZING EVENTS USING TIME AND AVAILABILITY

(71) Applicant: THEPLATFORM, LLC, Seattle, WA (US)

(72) Inventors: Paul Meijer, Seattle, WA (US); Mark Hellkamp, Bothell, WA (US)

(73) Assignee: THEPLATFORM, LLC, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/496,749

(22) Filed: Sep. 25, 2014

(65) Prior Publication Data

US 2015/0082312 A1 Mar. 19, 2015

Related U.S. Application Data

(63) Continuation of application No. 13/446,830, filed on Apr. 13, 2012, now Pat. No. 8,904,451.

(51) Int. Cl.
*G06F 9/46* (2006.01)
*H04N 21/231* (2011.01)
*H04N 21/241* (2011.01)
*H04L 29/08* (2006.01)

(52) U.S. Cl.
CPC ....... *G06F 9/466* (2013.01); *H04N 21/23103* (2013.01); *H04N 21/241* (2013.01); *H04L 29/08144* (2013.01)

(58) Field of Classification Search
None
See application file for complete search history.

(56) References Cited

U.S. PATENT DOCUMENTS

| | | | |
|---|---|---|---|
| 7,155,475 B2 | 12/2006 | Agnoli et al. | |
| 7,155,716 B2 | 12/2006 | Hooman et al. | |
| 7,853,120 B2 | 12/2010 | Bumgardner et al. | |
| 8,539,509 B2 * | 9/2013 | Tobe | G06F 9/542 719/314 |
| 8,739,176 B1 * | 5/2014 | Darling | G06F 9/4881 718/103 |
| 2003/0009553 A1 | 1/2003 | Benfield et al. | |
| 2004/0113936 A1 | 6/2004 | Dempski | |
| 2004/0158865 A1 * | 8/2004 | Kubler | G06Q 30/02 725/82 |
| 2005/0147090 A1 * | 7/2005 | MacLeod Beck | G06F 17/2765 370/352 |
| 2008/0263555 A1 * | 10/2008 | Ventroux | G06F 9/4881 718/103 |
| 2008/0285061 A1 * | 11/2008 | Oteki | H04N 1/32358 358/1.3 |
| 2008/0301175 A1 | 12/2008 | Applebaum et al. | |
| 2009/0213247 A1 * | 8/2009 | Tanaka | H04N 5/2354 348/240.99 |

(Continued)

*Primary Examiner* — Abu Ghaffari
(74) *Attorney, Agent, or Firm* — Ballard Spahr LLP (57) ABSTRACT

This disclosure relates to methods and systems for queuing events. In one aspect, a method is disclosed that receives or creates an event and inserts the event into a queue. The method determines at least one property of the event and associates a priority with the event based on the property. The method then processes the event in accordance with its priority.

20 Claims, 7 Drawing Sheets

(56) References Cited

U.S. PATENT DOCUMENTS

2010/0057583 A1   3/2010   Jeffs et al.
2011/0265099 A1*  10/2011  Tobe ...................... G06F 9/542
                                                         719/314
2011/0276396 A1*  11/2011  Rathod ............. G06F 17/30867
                                                         705/14.49

* cited by examiner

METHODS AND SYSTEMS FOR PRIORITIZING EVENTS USING TIME AND AVAILABILITY

CROSS REFERENCE TO RELATED APPLICATION

This application is a Continuation of U.S. Non-Provisional application Ser. No. 13/446,830 filed Apr. 13, 2012, herein incorporated by reference in its entirety.

BACKGROUND

In any system in which multiple users demand attention from a limited resource, the system must be capable of handling scenarios in which the users simultaneously ask for more than the system can deliver. One way of dealing with potential log jams in such a system is to implement queues that cause each requested transaction to be handled in turn. First-in first-out (FIFO) and first-in last-out (FILO) are common queue implementations, in which transactions are handled either in the order in which they are received (FIFO) or from most newest to oldest (FILO). Although these queue implementations have the effect of handling transactions in turn, they do not have the ability to examine the details of the transaction being requested to more efficiently handle a queue, or to take transactions out of the normal queue order in a systematic fashion that improves the performance of the system.

SUMMARY

It is to be understood that both the following general description and the following detailed description are exemplary and explanatory only and are not restrictive, as claimed. Provided are methods and systems for queuing events or transactions within a system.

In one aspect, a method for processing events is described. The method includes creating an event and inserting that event into a queue. At least one property associated with the event can be identified, and a priority can be associated with the event based on that property. The event is then processed in accordance with the priority. In one aspect, the event is an event for processing content, for example, audio or video, such as a video ingestion event, a video conversion event, a video distribution event, or a messaging event.

The property associated with the event can be a time after which the event can be processed. The property associated with the event can also relate to the type of event, and the priority associated with the event can be the availability of a system or agent configured to process events of the type. The property associated with the event can also be the identity of a requestor of the event, and the priority associated with the event can be assigned such that, when there are multiple events submitted by multiple requestors, an event from each requestor will be processed in turn.

The property associated with the event can also be the identity of an object or device on which the event will operate, and the priority associated with the event prevents other events from operating on the same object until the event is complete.

In another aspect, a multi-tenant system is provided. The system includes multiple tenants that generate events, such as instructions to perform an action. The system also includes a processing system that is coupled to the tenants via communication links such as a wired or wireless network. The processing system can receive the events and perform an associated action. The processing system can support a queue that holds the events while they wait for processing. The queue can associate a processing priority with each event depending on properties of the event.

The property of the event can be a time after which the event is to be processed, a type of the event, an identity of the requestor or requesting device associated with the event, and an identity of an object on which the event will operate. The priority of the event can be a time after which an event is available to a system, the availability of a system configured to process events of the type, priority such that the processing system performs an event from each tenant in turn, or priority that prevents other events from operating on the object until the event is complete.

In yet a further aspect, a method for processing content such as video in a multi-tenant system is provided. The method can include creating an event that can include an action to be performed on a media object. The event can be stored in a queue and executed in accordance with a priority associated with that event. A priority can then be associated with each event in the queue. The priority can be the time after which the event is available to a system, the availability of a system configured to process events of the type, priority such that the processing system performs an event from each requestor in turn, or priority that prevents other events from operating on the object until the event is complete.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the distribution points of each of the ranges are significant both in relation to the other distribution point, and independently of the other distribution point.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc, of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the from of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
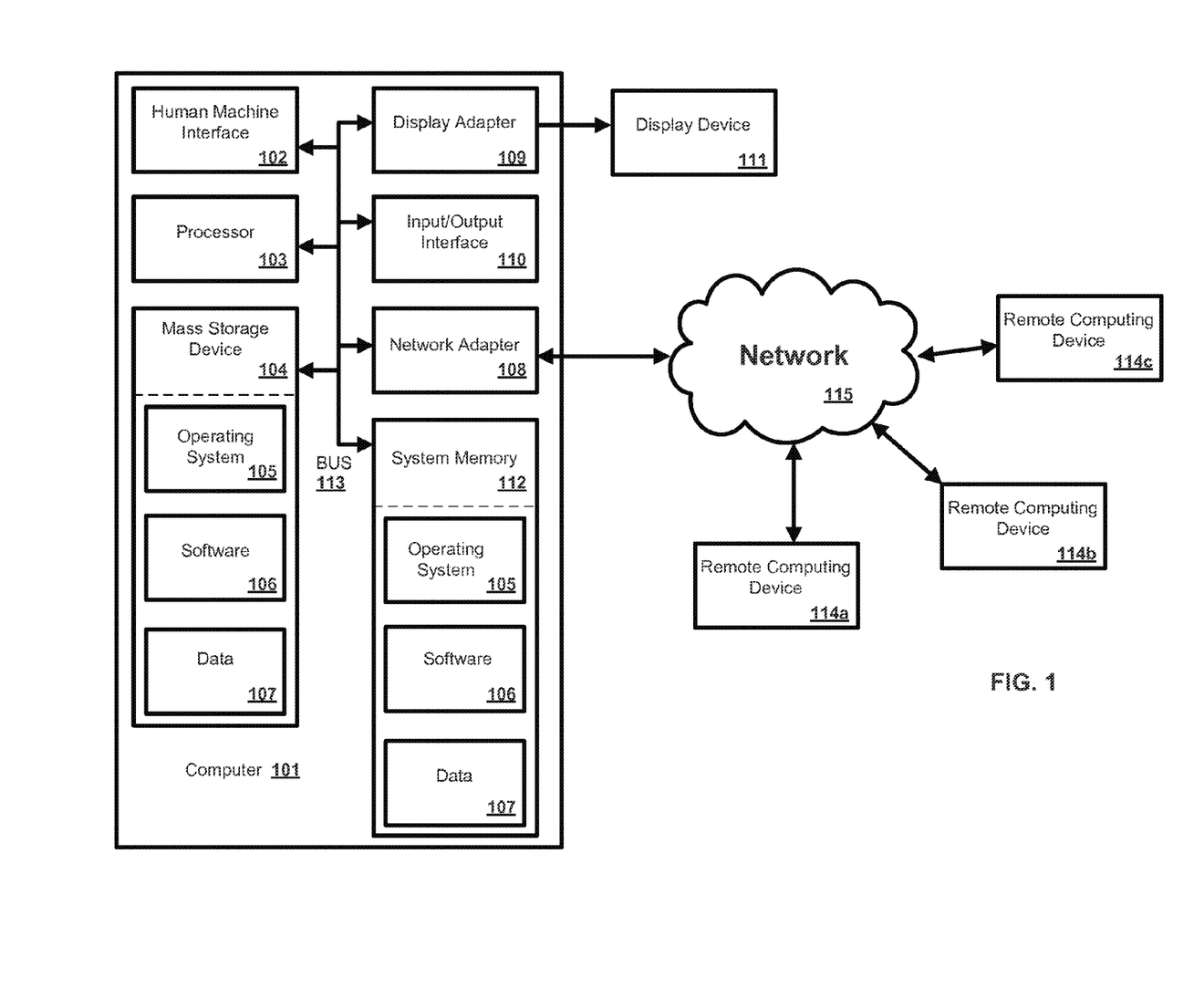
FIG. 1 is a block diagram illustrating an example of a system in which the methods and systems described herein can operate.

FIG. 1 illustrates various aspects of an exemplary system in which the present methods and systems can operate. The present disclosure relates to a method for processing events, and in one embodiment, a multi-tenant system. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary aspect, the methods and systems can be implemented on a computer 101 as illustrated in FIG. 1 and described below. The methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, software 106, data 107, a network adapter 108, system memory 112, an Input/Output Interface 110, a display adapter 109, a display device 111, and a human machine interface 102, can be contained within one or more remote computing devices 114a,b,c, physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 may contain data such as media, video, audio, or other data 107 and/or program modules such as operating system 105 and software 106 capable of manipulating, translating, transcoding, or otherwise editing the data 107 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (MD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and media manipulation software 106. Each of the operating system 105 and media manipulation software 106 (or some combination thereof) can comprise elements of the programming and the media manipulation software 106. Media, video, audio, or other data 107 can also be stored on the mass storage device 104. Media, video, audio, or other data 107 can be stored in any of one or more databases known in the art. Examples of such databases comprise, DB2®, Microsoft® Access, Microsoft® SQL. Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device W. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114a,b,c. By way of example, a remote computing device can be a personal computer, portable computer, smartphone, a server, a router, a network computer, a peer device or other common network node, and so on. Logical connections between the computer 101 and a remote computing device 114a,b,c can be made via a network 115, such as a local area network (LAN) and/or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of media manipulation software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, hut are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
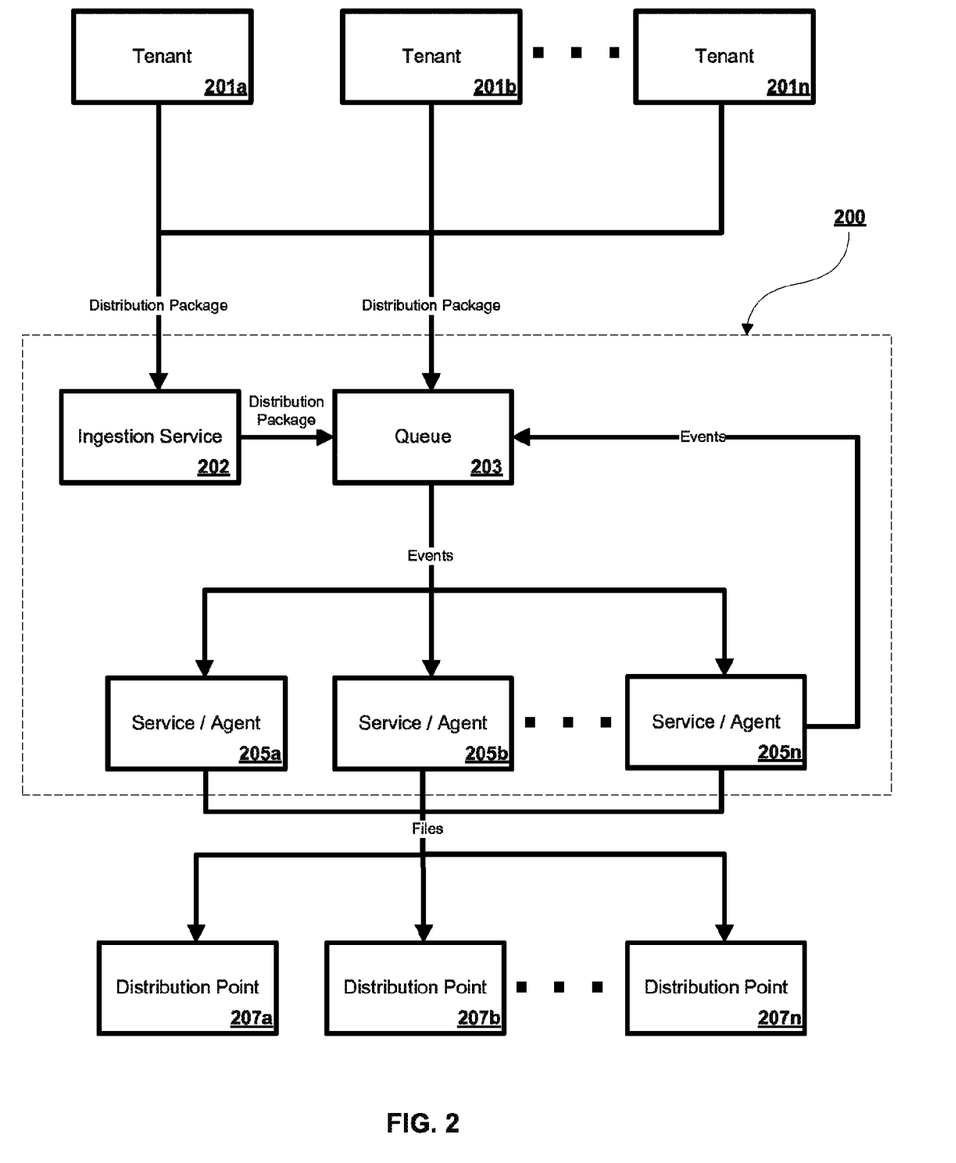
FIG. 2 is a block diagram illustrating an example of an embodiment of a queuing system in accordance with the methods and systems described herein.

Turning now to FIG. 2, a block diagram illustrating an exemplary embodiment of a queuing system 200 in accordance with the methods and systems described herein is shown. The exemplary embodiment of FIG. 2 illustrates a multi-tenant environment in which multiple tenants 201a,b,n access a system that includes one or more services/agents 205a,b,n. In the exemplary embodiment, the system 200 receives requests to perform events from one or more tenants 201a,b,n, queues the events in the queue 203 and then distributes the events to at least one service/agent 205a,b,n for processing. In an exemplary embodiment, the system is used to perform various processing and/or distribution of media created by the tenants 201a,b,n.

For example, a tenant 201a,b,n may generate one or more media distribution packages, that can include content such as, but not limited to, audio and/or video files. The system is capable of using a service/agent 205,a,b,n to process the media distribution packages for various services. The system is also capable of distributing the distribution packages to various services. As one non-limiting example, the tenant 201a,b,n may create a media distribution package that includes a movie, and may seek to distribute the media distribution package to multiple distribution points 207a,b,n at which a consumer may view the movie. By way of example, the distribution points 207a,b,n can include video streaming services that stream the movie to a television, computer, set top box, smartphone, tablet computer, or other device capable of receiving the stream. The distribution points 207a,b,n can also include video or other data downloading services that allow a media distribution package to be downloaded to a television, computer, set top box, smartphone, tablet computer, or other device capable of receiving the distribution package. The distribution point can also include media distribution interact sites that allow software such as web browsers or other applications to access the website to play the distribution package through such website.

Frequently, in this example, a tenant 201a,b,n may want the video to end up at more than one such distribution point 207a,b,n. In conventional systems, this presents a problem in that each distribution point may have different requirements for the way files it receives must be formatted and processed. By way of example, some distribution points 207a,b,n may require video to be formatted in a Motion Picture Experts Group format, such as .mpeg, .mp3, .mp4, or other file formats, while other distribution points 207a,b,n may require video to be formatted in accordance with streaming technologies, such as Adobe Flash, Microsoft Silverlight, or other streaming formats. Distribution points 207a,b,n may also use the same or similar file formats, but may require different for multiple) frame rates, resolutions, or file sizes. As another example, different distribution points 207a,b,n can also have different advertisement policies, or can have restrictions on geographical regions that can access the media. The formats, frame rates, compression schemes, streaming technologies, policies, restrictions, and distribution mechanisms available for audio and video are continuously changing as video compression and distribution technology changes.

Further complicating the problem is that some distribution points 207a,b,n may require that the files it receives have protection that prevents or deters unauthorized copying and distribution of the distribution package. For example, Digital Rights Management (DRM) such as, but not limited to, the Content Scrambling System (CSS), Protected Media Path (PMP), Advanced Access Content System (AACS), and Marlin systems may need to be associated with the file. The problem is further complicated because providing the distribution package to certain distribution points 207a,b,n may not be as simple as transmitting a file. Certain distribution points 207a,b,n may perform further processing outside of the control of the system, and such processing can take an extended period of time, and can also fail or otherwise terminate unexpectedly. In some systems, success or failure of a distribution operation can only be identified by checking back with the system to check the status of the operation.

To distribute the media distribution package in the example above to multiple distribution points 207a,b,n, the media distribution package may have to be processed multiple times in multiple different ways to accomplish the desired distribution. The exemplary system 200, on the other hand, provides multiple services/agents 205,a,b,n that can perform the necessary operations. The exemplary system 200 can also perform the necessary operations for multiple tenants 201a,b,n, and/or on multiple media distribution packages, whether the media distribution packages are received from one or multiple tenants 201a,b,n. The queuing system disclosed herein includes methods and systems that can effectively handle multiple process steps for multiple distribution packages submitted for handling by multiple tenants 201a,b,n. As one of skill in the art would recognize, however, the queuing system is not limited to a multi-tenant environment. For example, the system can also be used in single tenant environments to effectively handle processing for multiple distribution packages, or for single distribution packages that may benefit from, or be subject to, multiple processing steps. Although the exemplary embodiments described herein relate to the processing of media distribution packages, the system can be used for queuing of any type of files, and is not limited to media processing.

Turning back to FIG. 2, in an exemplary embodiment, a tenant 201a,b,n is a user of the system. Each tenant 201a,b,n can be a computing device or network of computers such as the computer 101 described in FIG. 1. Each tenant 201a,b,n can be a computer configured to create, edit, and/or store media, such as video and audio. Each tenant 201a,b,n can also be an account that provides access to the system 200 to a user, such as a subscriber to the system, a media publisher or distributor, or other person or company that may use the system 200. The illustration of FIG. 2 includes three tenants 201a,b,n. However, as one of in the art would understand, the present disclosure is applicable to systems having as few as one tenant, and the maximum number of tenants 201a,b,n is limited only by available bandwidth and resources in a given implementation, and the systems and methods disclosed here have no limit on the number of potential tenants 201a,b,n.

Each tenant 201a,b,n can submit one or more distribution packages to the system for processing. In an exemplary embodiment, the distribution packages contain content, such as movies, television programs, other video or audio. In an alternative exemplary embodiment, the distribution packages can contain any type of file which the tenant 201a,b,n wishes the system to process, such as, for example, word processing files, spreadsheet files, and image files. Distribution packages can also include information about distribution package, such as, for example, the title, author, description, storage location, format, size, duration, or destination. It can also contain instructions or events that are to be performed as part of the file processing. In yet another alternative exemplary embodiment, the distribution packages can include URLs, access restriction policies, and advertisement policies. One of skill in the art would understand that each of these types of files can be stored in a number of different formats, and all such formats are within the scope of the present disclosure.

In an exemplary embodiment, the tenant 201a,b,n submits the distribution package to the system by way of an ingestion service 202. The exemplary ingestion service 202 can be one or more computing devices or networks of computers that act as a repository for distribution packages that are to be processed by the system. By way of example, the ingestion service 202 receives a distribution package and creates events based on the information therein. In an exemplary embodiment, the ingestion service 202 processes everything but the follow-up actions, which it adds to a queue 203 for further processing. In an alternative exemplary embodiment, the ingestion service 202 adds all events to be processed to a queue 203 for further processing. As one of skill in the art would recognize, the precise division of processing between the ingestion service 202 and processing that is queued for later processing is an implementation detail that can vary from system to system.

The ingestion service 202 can take in the distribution package from a tenant 201a,b,n as part of a "pull" operation in which the ingestion service 202, from time to time, communicates with a tenant 201a,b,n and initiates a transfer of distribution packages from the tenant 201a,b,n to the ingestion service 202. The ingestion service 202 can pull media from the tenant 201a,b,n periodically, or can do on in response to a notification that the tenant 201a,b,n has distribution packages ready to be transferred into the system. The ingestion service 202 can also take in the distribution package as part of a "push" operation wherein the tenant 201a,b,n transmits distribution packages for processing to the ingestion service 202. In an alternative exemplary embodiment, distribution packages need not pass through an ingestion service 202. Rather, distribution packages that enter the system can be transmitted directly into a queue 203 for handling.

In an exemplary embodiment, the distribution package is associated with events or instructions that will identify the types of processing that the distribution package is to undergo. By way of example, if the distribution package is a movie that is to be distributed to a website streaming service and to the video-on-demand (VOD) service of a video service provider, the events associated with the distribution package could include two publish events. The first publish event prepares the distribution package for the streaming service by, for example, performing the appropriate conversions for that service and providing the converted file (or files) to the streaming service. The first publish event could also include tasks such as checking on the status of the transmission of the file to the streaming service, and whether or not the file was successfully added to the streaming service. In this example, the second publish event would prepare the distribution package for the provider's VOD service by performing the appropriate conversions for that service and transmitting the file to the cable company for distribution within its system. In this example, the publish event could appear to be a high level command to the tenant, such as "publish," and the system would determine the appropriate steps for publication to the chosen service. In an alternative example, the publish command could be a collection of more detailed commands, such as 1) convert the distribution package to a given file type, 2) apply certain post processing, and 3) transmit the resulting file to a given destination. Once the events applicable to a given distribution package are established, the events are placed on a queue 203 and processed.

The events are then placed on a queue 203 for processing. In an exemplary embodiment, the queue 203 is a list of events that the system will handle. In an alternative exemplary embodiment, the queue 203 is a database, wherein each entry of the database is an event. In an exemplary embodiment, the list of events is stored within a single computer or network of computers that has knowledge of all events in the queue 203. In alternative exemplary embodiments, however, the system can include multiple queues. In the multiple-queue embodiment, the events can be divided into queues in a wide variety of ways depending on the particular application. By way of example only, related events, such as those waiting for a particular agent 205,a,b,n or a particular distribution package, can be grouped together. Alternatively, the multiple-queue embodiment can divide events so as to balance the load on the system so that each queue 203 is roughly equivalent in size or backlog.

The events can include information that allows them to be handled in an efficient manner.

In an exemplary embodiment, in which the distribution package to be processed is a media distribution package, the event can include the following information.

| Event Information Field | Description |
| --- | --- |
| DateAdded | Date and time the event was added to the queue |
| OwnerID | Identity of the tenant that added the event |
| MediaID | The media file to be processed |
| Method | The type of operation to perform on the media file |
| Ready | Is the media file ready to be processed |
| AgentName | The agent that is currently using the media file |
| ScheduledTime | The time at which the action should be processed |

In an exemplary embodiment, the event information is stored in a file associated with the distribution package, for example, an extensible markup language (XML) file, spreadsheet, database, or text file. In alternative embodiments, the event information can be embedded in the file itself such that the event information can be read from the file. As one of skill in the art would understand, the fields described in the exemplary embodiment are simply examples of the types of fields that could be used to prioritize events in a queue 203 and the fields listed above are neither exclusive nor exhaustive, but rather, are intended only to illustrate the operations associated with the queue 203.

As events in the queue 203 are processed, they are handled by one or more services or agents 205,a,b,n that are capable of performing the requested task. In an exemplary embodiment, each agent 205,a,b,n is a program or set of programs configured to carry out a particular task. By, way of example only, an agent 205,a,b,n could exist for each type of conversion that the system can perform. An agent 205,a,b,n could also exist for each type of distribution point 207a,b,n to which a distribution package is to ultimately be published. Agents 205,a,b,n could also exist that could carry out various tasks within the system. For example, an agent 205,a,b,n can be capable of sending email or other messages in response to the occurrence of certain events. An agent 205,a,b,n can also be capable of checking a service to determine the status of a publication operation carried out by another agent 205,a,b,n. An agent 205,a,b,n can also be capable of sharing a file with other tenants 201a,b,n. In an alternative exemplary embodiment, each agent 205,a,b,n could provide multiple functions. The particular tasks described above are intended to be exemplary, and are not exhaustive. One of skill in the art would understand that software programs capable of performing these tasks, including tasks for the conversion and processing of media files, are well known.

An agent 205,a,b,n can be a program, for example, an application, designed to perform a specific task running in a process or thread on a given computer or network of computers along with a number of other agents 205,a,b,n. Alternatively, an agent 205,a,b,n can be a special purpose computer or network of computers that is dedicated to performing a single task or a small number of tasks.

One task that can be performed by an agent 205,a,b,n can be the task of delivering a file that has been processed by the system 200 to one or more distribution points 207a,b,n. In an exemplary embodiment where the distribution package includes a video file, a distribution point 207a,b,n can be a user-facing media outlet. A distribution point can also be a gateway provided for content providers to deliver content to a user-facing media outlet, such as, for example, an internet address, file transfer protocol (FTP) server, or cloud storage.

A user-facing media outlet can be, for example, a video service provider, a video streaming service, an audio streaming service, a media downloading service, or any other service that allows access to media. In an alternative exemplary embodiment, the distribution point 207a,b,n may not be user-facing, but may simply be storage for the file, such as in an archive or backup, or another system that allows for later retrieval.

In an exemplary embodiment, delivering a file to a distribution point can include transmitting the file to the distribution point 207a,b,n or otherwise placing the file in a storage location where the distribution point can obtain the file. In an alternative exemplary embodiment, transmitting a file to the distribution point 207a,b,n can involve multiple steps, including transmitting the file, and then checking back at a later time to determine whether the file has been successfully loaded onto the distribution point. In this alternative embodiment, the agent 205,a,b,n can further check back with the distribution point 207a,b,n to acquire status of the file transfer, and determine whether the transfer of the file was successful. The agent 205,a,b,n can also create additional events and place them back on the queue 203 that will invoke an agent 205,a,b,n sometime in the future that will communicate with the distribution point to determine the status of the transfer of the file.

Figure 3:
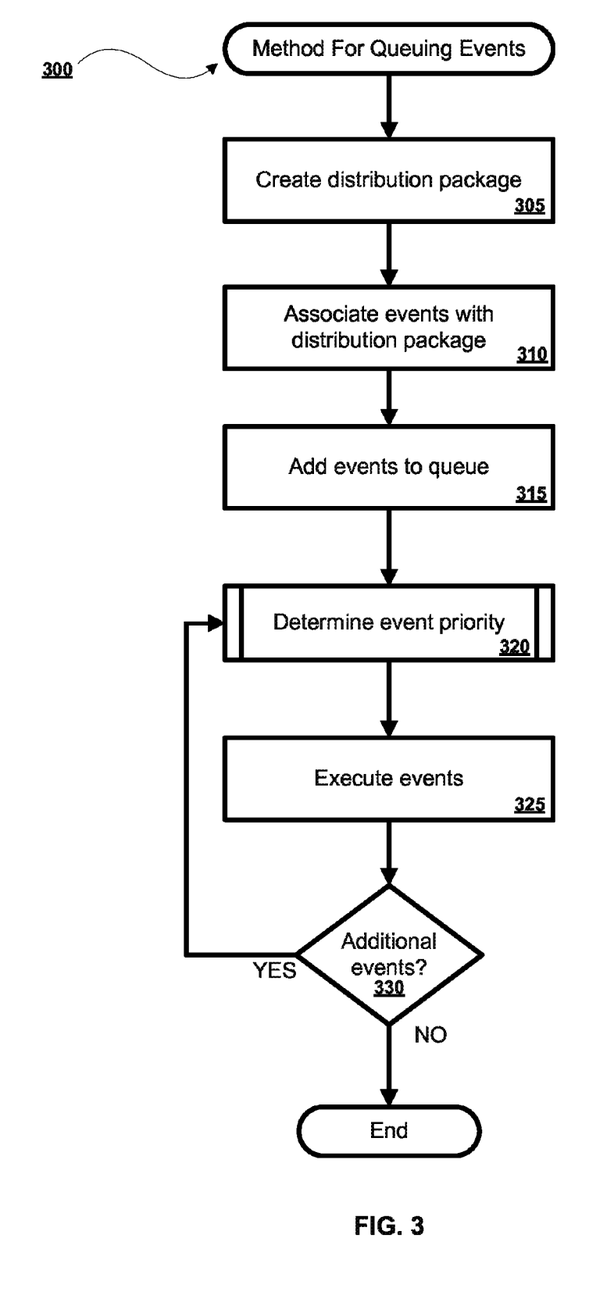
FIG. 3 is a flow chart illustrating an example of a method of queuing events in accordance with the methods and systems described herein.

FIG. 3 is a flow chart illustrating an exemplary method 300 of queuing actions in accordance with the present disclosure. FIG. 3 will be discussed with reference to FIG. 1 and FIG. 2. Beginning with step 305, a distribution package is created that is to be processed by the system. In an exemplary embodiment, the distribution package is created by a tenant. In an alternative exemplary embodiment, the distribution package is created by another system, computer, network of computers, or other entity, and stored in or transmitted to a tenant. The method then proceeds to step 310.

In step 310, events are associated with the distribution package. In an exemplary embodiment, an event is a process, action, or other task that will be performed as the system processes the distribution package. In an exemplary embodiment, the event could include, but is not limited to, a publish event, a conversion event, a distribution event, a communication event, or a billing event. In an alternative embodiment, an event can be any type of event that takes place within a given system, and is not limited to events relating to the processing of media files.

By way of example, a publish event can be an event that specifies a destination for the distribution package, such as a distribution point 207a,b,n. Such a publish event may also describe any processing that would take place on that distribution package to prepare it for its destination. Alternatively, the system could store, based on the identity of the destination for the distribution package, any processing that would be applied to the distribution package prior to delivery of the file to the destination. A conversion event can be an event that converts or transcodes a file associated with a distribution package from one format to another, such as, for example, by encoding, decoding, upconverting, downconverting, splicing, or performing other processing that would be known to one of skill in the art. For example, a conversion could occur from audio video interleave (ANTI) format to MPEG-2 or MPEG-4. The conversion event could also include parameters relating to the output, such as, but not limited to, the frame rate, scale, size, audio level, and video quality. The conversion event can also convert a file into the same destination format, for example, MPEG-2 to MPEG-2, where the conversion does not change the file format, but may change other parameters associated with the file.

A distribution event can be an event that directs a file to its destination distribution point. By way of example, the distribution point 207a,b,n can be a repository in which the file is to be placed, the distribution event can include an address for the repository. For example, the address can be an interact FTP address, the interact protocol (IP) address of a server, or the path to network or local storage. The distribution event may also include log-on information, such as a user ID and password, if the destination requires authentication for access. The distribution event may also include security tokens or keys as necessary to negotiate a connection with the distribution point.

In an exemplary embodiment, a distribution event can also include additional events that perform additional tasks that relate to distribution. By way of example, the distribution event can include a status-update event that checks the distribution point 207a,b,n for the status of the transmission. If the transmission is not complete, the status-update event can continue to run, or can create another status-update event that will run at a later time.

A communication event can be an event that provides a notification, status update, or other information relating to the system's processing. The process of distribution package processing can potentially take an extended period of time, and can involve multiple steps, some of which, such as the distribution event, can fail. The systems and methods disclosed herein can use a communication event to notify other actors in the system, such as a tenant, or actors outside the system, such as any party that might be interested in the progress of distribution package processing. By way of example, a communication event can send an email, text message, short message service (SMS) message, multimedia messaging service (MMS) message, telephone call, or page. The communication event can also post update information to a public or private messaging or social media services where it can be reviewed by anyone who has access thereto.

Although the events have been described separately, the events can be combined, nested within one another, or further separated to provide more detailed control over the system processing. For example, the publish event could include a convert event and a distribution event (or the equivalent functionality) by default. In this way, the tenant 201a,b,n could simply specify that the file is to be published to a particular distribution point. The systems and methods could then create the appropriate convert and distribution events for that distribution point. Alternatively, the tenant 201a,b,n could create separate convert and distribution events that achieve a similar result, but provide the tenant 201a,b,n with additional control. In this way, the event handling allows for a flexible platform that can both hide details from the tenants 201a,b,n and allow for simplicity of operation, or expose details to tenants 201a,b,n and allow for greater control.

The method then proceeds to step 315, wherein the events are added to a queue 203. The method then proceeds to step 320 wherein the priority for the events in the queue 203 are determined and a priority is associated with each event. There are a number of considerations that can be used to determine event priority. For example, event priority can be determined based on the order in which the events were added to the queue 203. Such an approach may not result in the most efficient handling of events, however, and it may also allow certain tenants 201a,b,n or certain distribution packages to appropriate an undue share of system resources at the expense of other tenants 201a,b,n and distribution packages. For this reason, the systems and methods disclosed herein can consider additional factors in setting the priority of events. By way of example, the systems and methods disclosed here consider a time after which an event is available to a system, the availability of the system or agents 205,a,b,n in the system that are configured to process events of the type, whether each tenant 201a,b,n on the system has had an opportunity to have its events processed, priority that prevents other events from operating on the object until the event is complete, and whether certain preconditions for processing an event have occurred. The step 320 of determining event priority will be discussed in further detail with respect to FIGS. 4-7.

The method then proceeds to step 325, wherein the events are executed according to their priority. The method then proceeds to decision step 330, wherein it is determined if additional events are to be processed. Additional events can be spawned by events currently executing, for example, a communication event or an event that checks status of a distribution. Additional events can also be added to the queue 203 by tenants 201a,b,n. If additional events are to be processed, the YES branch is followed to step 320 wherein event priority is determined. When returning to step 320, in an exemplary embodiment, the system can reprioritize all events in the queue 203 in view of the new event. In an alternative embodiment, the system can reprioritize the new event separately from any events that have already been prioritized. Turning again to decision step 330, if it is determined that there are no additional events to process, the NO branch is followed and the method ends.

Figure 4:
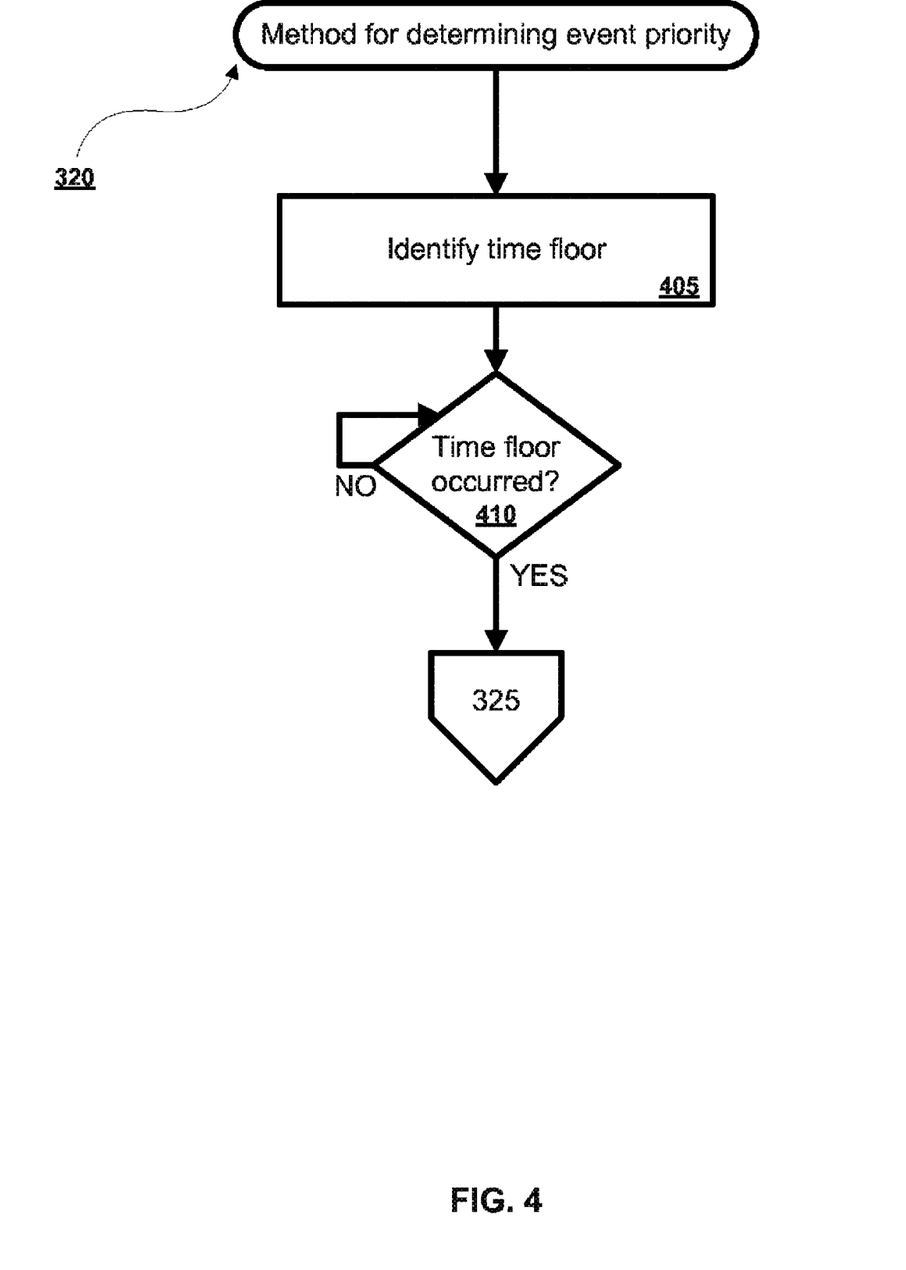
FIG. 4 is a flow chart illustrating an example of a method for determining event priority within the queue in accordance with the methods and systems described herein.

Turning now to FIG. 4, a first method for determining event priority 320 is described. FIG. 4 is a method wherein priority of an event is determined, at least in part, by a time before which the event should not be processed. Beginning with step 405, a time floor for the event is identified. By way of example, the time floor is expressed as a time and date. For uniformity purposes, the time can be a universal time, such as Greenwich Mean Time (GMT). The time and date can be stored in a tile associated with the event, such as XML file or a database, or it can be stored in the event itself. The method then proceeds to decision step 410, wherein it is determined if the time floor has occurred. If the time floor has not occurred, the NO branch is followed and the method returns back to decision step 410. If the time floor has occurred, the YES branch is followed and the method returns to step 325 of FIG. 3, wherein the event is executed.

Figure 5:
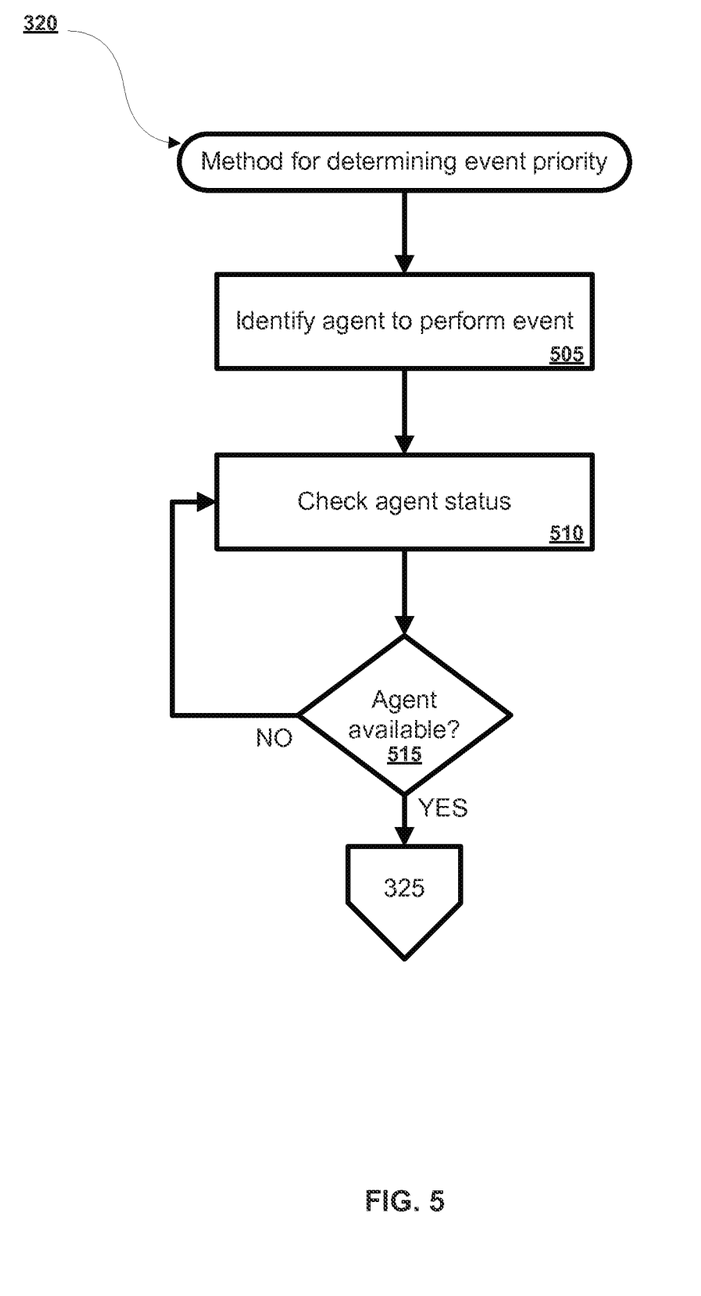
FIG. 5 is a flow chart illustrating another example of a method for determining event priority within the queue in accordance with the methods and systems described herein.

Turning now to FIG. 5, another method for determining event priority 320 is described. FIG. 5 is a method wherein priority of an event is determined, at least in part, by the availability of an agent 205,a,b,n to perform one or more tasks associated with the event. Beginning with step 505, an agent 205,a,b,n is identified that can perform one or more tasks associated with the event. The method then proceeds to step 510, wherein it is determined if the agent 205,a,b,n is available to process the event. By way of example, if one of the tasks to be performed is the conversion of a video file from one format to another, checking the availability of an agent 205,a,b,n to perform the task can involve requesting the status of the system or process that performs conversion tasks. The system or process can then report whether it is busy, not available, or available. The method then proceeds to decision step 515, wherein it is determined whether the agent 205,a,b,n is available. If the agent 205,a,b,n is not available, the NO branch is followed to step 510 the agent 205,a,b,n is available, the YES branch is followed to step 325 of FIG. 3, and the event is executed.

Figure 6:
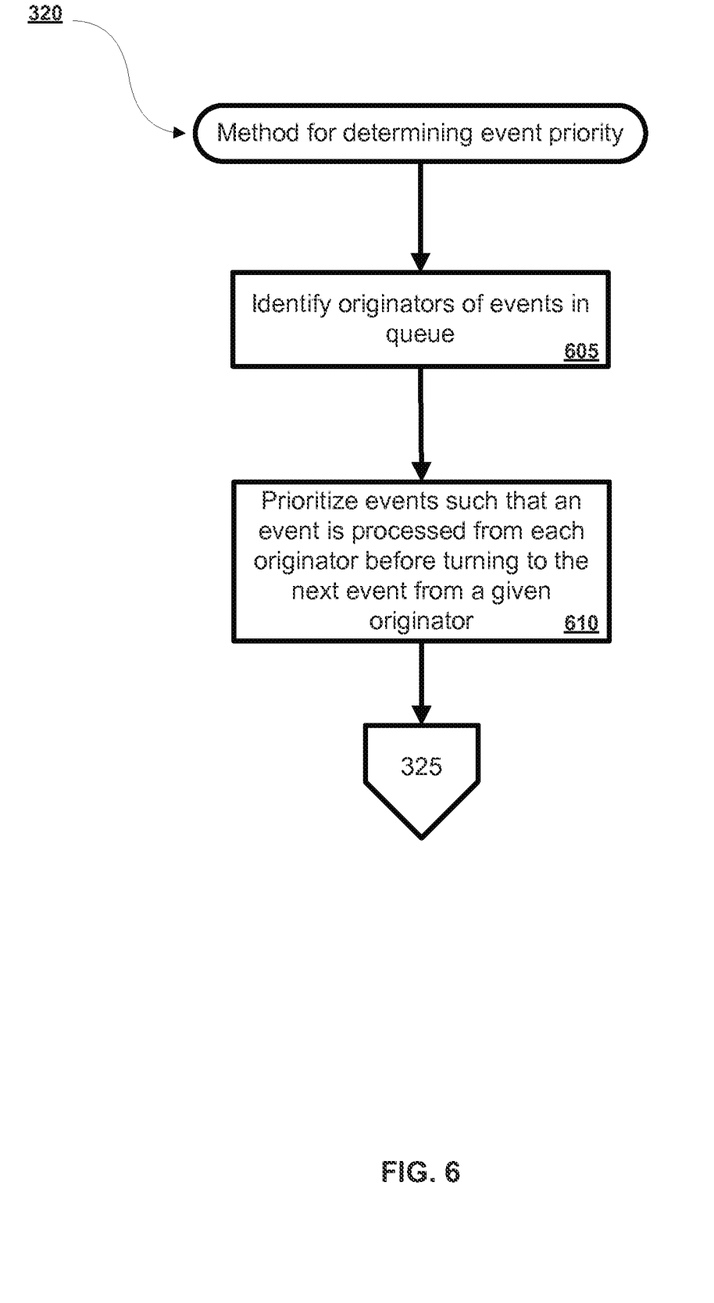
FIG. 6 is a flow chart illustrating another example of a method for determining event priority within the queue in accordance with the methods and systems described herein.

Turning now to FIG. 6, another method for determining event priority 320 is described. FIG. 6 is a method wherein priority of the event is determined, at least in part, to establish fairness among the tenants 201a,b,n of the system. Beginning with step 605, the originators or requestors of the events in the queue 203 are determined. In an exemplary embodiment, the originators can be identified by the contents of the OwnerID field associated with the event. The method then proceeds to step 610, wherein the events are prioritized such that an event is processed from each originator before turning to the next event from a given originator. By way of example, a hypothetical system according to this disclosure includes four tenants A, B, C, and D. For the purposes of this example, tenant A has submitted 3 events, B has submitted 2 events, C has submitted 1 event, and D has submitted 5 events. In step 610, the method would process one event from tenant A, one from tenant B, one form tenant C, and one from tenant D, After processing, A will have 2 events remaining, B will have 1 event remaining, C will have no events remaining, and D wilt have 4 events remaining. In the exemplary embodiment, the process continues in this manner until all events from A, B, C, and D have been processed. The method then returns to step 325 and executes the events.

Figure 7:
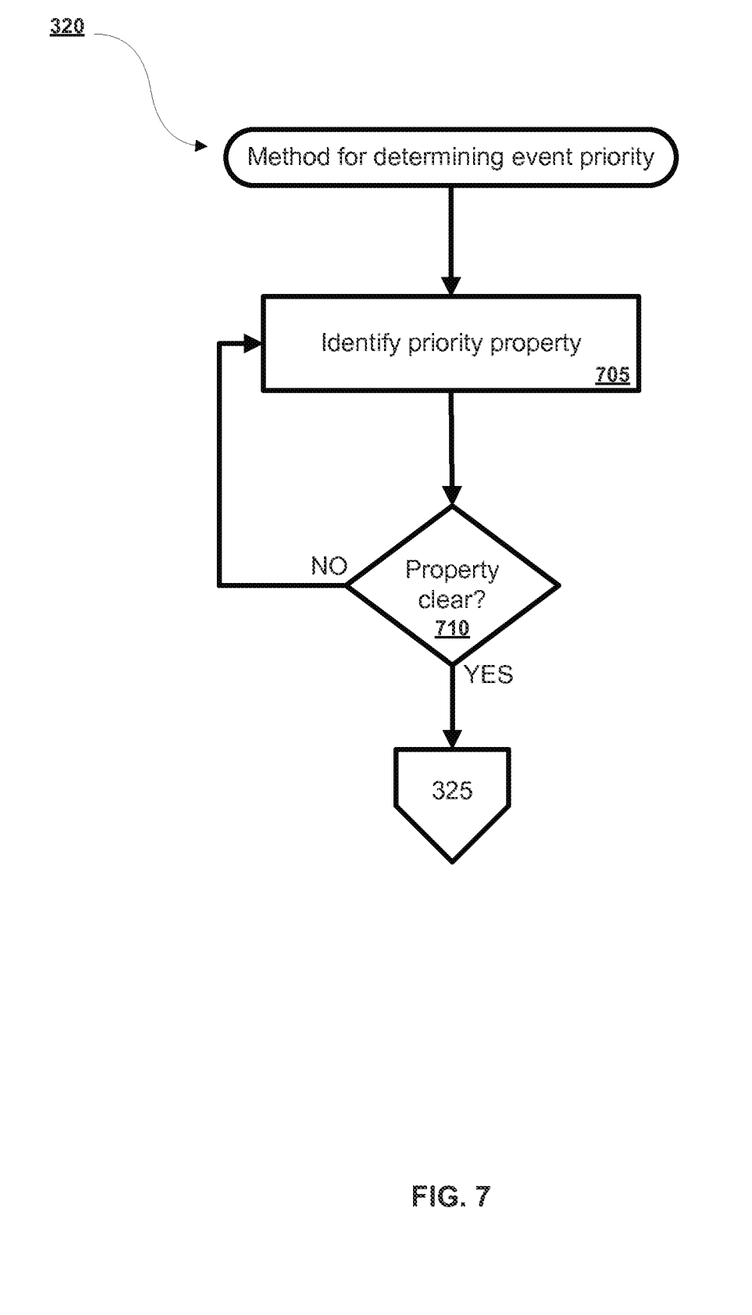
FIG. 7 is a flow chart illustrating another example of a method for determining event priority within the queue in accordance with the methods and systems described herein.

Turning now to FIG. 7, another method for determining event priority 320 is described, FIG. 7 is a method wherein event priority is determined such that one event will follow another based on a property of that event. Beginning with step 705, the event property is identified. By way of example, the event property could be the mediaID of media associated with the event. In this example, if there are multiple publish or convert events associated with the given mediaID, it may not be appropriate to execute these events simultaneously, because simultaneous processing could corrupt the file, or otherwise hinder processing. In this example, then, the second event that is operating on media with the given mediaID will remain on the queue 203 until the first event has completed processing.

In an alternative exemplary embodiment, the property of the event can be the completion status of another event that will complete processing before the event can be executed. By way of example, an event property could be a Ready field, that, by way of example only, could be a Boolean value that, by default, is set to true. An event property could also be an identifier of another event, for example, an EventDependency field. In an exemplary embodiment, in step 705 the events in the queue 203 could be scanned for events that will operate on media having the same mediaID. If multiple events are identified that will operate on the same medial), then the events can be sequenced, for example, according to the other priority methods described above with respect to FIGS. 4-6. Then, all such events in the queue 203, except for the first event to be processed, can have their Ready field set to FALSE, and have their EventDependency field set to the ID of the event that is being processed. Once the event has been processed, the method can scan the event queue 203 for the next event that was dependant on the processing of that event, and set its Ready flag to TRUE. An event could have multiple dependencies that must be met before the Ready flag is set to TRUE, and therefore may have multiple EventDependency fields to allow for such processing. As one of skill in the art would understand, the use of flags and dependency fields is merely an example of one way events could be sequenced, and other methods, such as, but not limited to assigning specific sequencing information, could also be used.

The method then proceeds to decision step 710, wherein it is determined whether the property is clear. In the first example above, the property is clear once no agents 205,a, b,n are operating on media with the given medial). In the second example above, if the Ready flag is set to TRUE, the property is clear. If the property is not clear, the NO branch is followed to step 705. If the preconditions are met, then the YES branch is followed and the method returns to step 325 of FIG. 3 and the events are executed.

Although several methods of prioritizing events have been described individually herein, they are not mutually exclusive and can be executed together. By way of example only, events can first be prioritized for fairness, and then further prioritized based on agent 205,a,b,n availability and satisfaction of preconditions. As one of skill in the art would understand, the methods for determining event priority can be used together in any combination, and they can also be used alone.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving a media distribution package comprising at least one media file;
   determining a first media file processing event based on the media distribution package;
   inserting the first media file processing event into a queue;
   selecting the first media file processing event from the queue for processing, wherein
      selecting the first media file processing event is prioritized based on a predetermined time after which the first media file processing event is to be processed and an identity of a source from which the media distribution package is received;
   processing the first media file processing event based on selecting the first media file processing event;
   determining a second media file processing event in the queue to prevent from being processed while the first media file processing event is being processed; and
   setting an attribute of the second media file processing event indicating that the at least one media file is unavailable for processing.

2. The method of claim 1, wherein the at least one media file comprises video and the first media file processing event comprises a video processing event.

3. The method of claim 1, wherein the at least one media file is modified by processing of the first media file processing event, further comprising distributing the modified at least one media file to a distribution point associated with the media distribution package.

4. The method of claim 1, wherein processing the first media file processing event comprises converting the at least one media file based on a requirement associated with a distribution point, wherein the distribution point is associated with the media distribution package, wherein the requirement comprises a format, a frame rate, a file size, a resolution, or a combination thereof of the at least one media file.

5. The method of claim 1, further comprising determining an attribute of the first media file processing event before selecting the first media file processing event, wherein the attribute specifies at least one of availability of the at least one media file or availability of an agent configured to process events of an event type associated with the first media file processing event.

6. The method of claim 1, wherein the predetermined time after which the first media file processing event is to be processed is based on one or more of availability of the at least one media file or availability of an agent configured to process events of an event type associated with the first media file processing event.

7. A method, comprising:
receiving a first media file processing event, wherein the first media file processing event comprises an action to be performed on a media object;
storing the first media file processing event in a queue;
selecting the first media file processing event from the queue for execution, wherein selecting the first media file processing event is prioritized based on a predetermined time after which the first media file processing event is to be processed and availability of a service configured to process events of an event type associated with the first media file processing event;
executing the first media file processing event based on selecting the first media file processing event;
determining a second media file processing event in the queue to prevent from being executed while the first media file processing event is being processed; and
setting an attribute of the second media file processing event indicating that the media object is unavailable for processing.

8. The method of claim 7, wherein the media object comprises video and the first media file processing event comprises a video processing event.

9. The method of claim 7, wherein selecting the first media file processing event from the queue is prioritized based on an identity of a source associated with the first media file processing event.

10. The method of claim 7, wherein the media object is modified by executing the first media file processing event, further comprising distributing the modified media object to a distribution point.

11. The method of claim 7, wherein executing the first media file processing event comprises converting the media object based on a requirement associated with a distribution point, wherein the requirement comprises a format, a frame rate, a file size, a resolution, or a combination thereof of the media object.

12. The method of claim 7, further comprising determining an attribute of the first media file processing event before selecting the first media file processing event, wherein the attribute specifies at least one of availability of the media object, the availability of the service, or the predetermined time after which the first media file processing event is to be processed.

13. The method of claim 7, wherein the event type comprises a publish event type, a conversion event type, a distribution event type, or a combination thereof.

14. The method of claim 7, wherein the attribute of the second media file processing event indicates, while the first media file processing event is executed, that the media object is unavailable for processing.

15. The method of claim 7, wherein determining the second media file processing event in the queue to prevent from being processed while the first media file processing event is being executed comprises determining that the second media file processing event modifies the media object.

16. An apparatus, comprising:
one or more processors; and
a memory having embodied thereon processor executable instructions that, when executed by the one or more processors, cause the apparatus to:
receive a first media file processing event, wherein the first media file processing event comprises an action to be performed on a media object,
store the first media file processing event in a queue configured for storing a plurality of events,
select the first media file processing event from the queue for processing, wherein the selecting the first media file processing event is prioritized based on a predetermined time after which the first media file processing event is to be processed and availability of a service configured to process events of an event type associated with first the media file processing event,
execute the first media file processing event based on selecting the media file processing event,
determine a second media file processing event in the queue to prevent from being processed while the first media file processing event is being executed, and
set an attribute of the second media file processing event indicating that the media object is unavailable for processing.

17. The apparatus of claim 16, wherein the media object comprises video and the first media file processing event comprises a video processing event.

18. The apparatus of claim 16, wherein the processor executable instructions that, when executed by the one or more processors, cause the apparatus to select the first media file processing event from the queue comprise processor executable instructions that, when executed by the one or more processors, cause the apparatus to prioritize selection based on an identity of a source associated with the first media file processing event.

19. The apparatus of claim 16, wherein the processor executable instructions that, when executed by the one or more processors, cause the apparatus to execute the first media file processing event comprise processor executable instructions that, when executed by the one or more processors, cause the apparatus to modify the media object, and wherein the processor executable instructions, when executed by the one or more processors, further cause the apparatus to distribute the modified media object to a distribution point.

20. The apparatus of claim 16, wherein the processor executable instructions that, when executed by the one or more processors, cause the apparatus to execute the first media file processing event comprise processor executable instructions that, when executed by the one or more processors, cause the apparatus to convert the media object based on a requirement associated with a distribution point, wherein the requirement comprises a format, a frame rate, a file size, a resolution, or a combination thereof of the media object.

* * * * *